United States Patent
Tseng et al.

(10) Patent No.: US 11,987,678 B2
(45) Date of Patent: May 21, 2024

(54) POLYESTER COMPOSITION FILM AND HOT MELT ADHESIVE LAMINATE COMPRISING THE SAME

(71) Applicant: Chang Chun Plastics Co., Ltd., Taipei (TW)

(72) Inventors: Chung-Hao Tseng, Taipei (TW); Te-Shun Lin, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 0 days.

(21) Appl. No.: 17/890,637

(22) Filed: Aug. 18, 2022

(65) Prior Publication Data
US 2023/0272173 A1    Aug. 31, 2023

Related U.S. Application Data

(60) Provisional application No. 63/313,881, filed on Feb. 25, 2022.

(30) Foreign Application Priority Data

Jul. 6, 2022 (TW) .................................. 111125360

(51) Int. Cl.
C08J 5/18 (2006.01)
B32B 7/02 (2019.01)
(Continued)

(52) U.S. Cl.
CPC . *C08J 5/18* (2013.01); *C09J 5/06* (2013.01); *C09J 7/29* (2018.01); *C09J 7/35* (2018.01);
(Continued)

(58) Field of Classification Search
None
See application file for complete search history.

(56) References Cited

U.S. PATENT DOCUMENTS

| | | | | |
|---|---|---|---|---|
| 5,532,053 A | * | 7/1996 | Mueller | .................... B32B 7/12 428/476.3 |
| 2009/0098352 A1 | * | 4/2009 | Wittmann | ............... B32B 27/08 442/287 |

(Continued)

FOREIGN PATENT DOCUMENTS

| JP | 2009521340 | 6/2009 |
|---|---|---|
| JP | 2018508613 | 3/2018 |

(Continued)

OTHER PUBLICATIONS

Shore Durometer—Wikipedia (https://en.wikipedia.org/wiki/Shore_durometer) (webpage retrieved Jun. 29, 2023) (Year: 2023).*

(Continued)

*Primary Examiner* — Vivian Chen
(74) *Attorney, Agent, or Firm* — WPAT, PC

(57) ABSTRACT

Provided is a polyester composite film, comprising a first thermoplastic polyether ester elastomer (TPEE) film and a second TPEE film. The melting point of a second TPEE resin of the second TPEE film is higher than that of a first TPEE resin of the first TPEE film, and the absolute difference in enthalpy of fusion between the first and second TPEE films is 5 J/g to 15 J/g. By adopting the first and second TPEE films having specific absolute difference of the enthalpy of fusion and controlling the melting points of the first and second TPEE resins, the polyester composite film can be well attached onto the fabric by hot pressing to obtain sufficient peel strength, and thereby the attached fabric can have excellent waterproof performance. Besides, a hot melt adhesive laminate comprising the polyester composite film also exhibits the above beneficial effects when attached to the fabric.

14 Claims, 5 Drawing Sheets

(51) Int. Cl.
  *B32B 7/027* (2019.01)
  *B32B 27/36* (2006.01)
  *C09J 5/06* (2006.01)
  *C09J 7/29* (2018.01)
  *C09J 7/35* (2018.01)
  *C09J 167/02* (2006.01)

(52) U.S. Cl.
  CPC ............ *C09J 167/025* (2013.01); *B32B 7/02* (2013.01); *B32B 7/027* (2019.01); *B32B 27/36* (2013.01); *B32B 2250/02* (2013.01); *B32B 2250/244* (2013.01); *B32B 2307/30* (2013.01); *B32B 2367/00* (2013.01); *B32B 2405/00* (2013.01); *C08J 2367/02* (2013.01); *Y10T 428/14* (2015.01); *Y10T 428/2813* (2015.01); *Y10T 428/31786* (2015.04)

(56) References Cited

U.S. PATENT DOCUMENTS

| | | | |
|---|---|---|---|
| 2018/0029345 A1* | 2/2018 | Tijssen | B32B 27/285 |
| 2019/0203382 A1* | 7/2019 | Cheng | D01F 8/04 |
| 2021/0062055 A1* | 3/2021 | O'Brien | C09J 5/06 |
| 2021/0138772 A1* | 5/2021 | Uto | B32B 27/08 |
| 2023/0116359 A1* | 4/2023 | Kato | H01M 50/198 |
| | | | 429/179 |

FOREIGN PATENT DOCUMENTS

| | | |
|---|---|---|
| JP | 2022545475 | 10/2022 |
| TW | I675135 B | 10/2019 |
| WO | 2019198635 | 10/2019 |

OTHER PUBLICATIONS

Examination Report of Japan Patent Application No. 2022-139923, Oct. 17, 2023.
Examination Report of Taiwan Patent Application No. 111125360, Jun. 5, 2023.
Decision to Grant a Patent of Taiwan Patent Application No. 111125360, issued on Feb. 6, 2024.
Decision to Grant a Patent of Japan Patent Application No. 2022-139923, issued on Mar. 6, 2024.

* cited by examiner

POLYESTER COMPOSITION FILM AND HOT MELT ADHESIVE LAMINATE COMPRISING THE SAME

CROSS-REFERENCE TO RELATED APPLICATION

Pursuant to 35 U.S.C. § 119(a) and (e), this application claims the benefits of the priorities of Provisional Application No. 63/313,881 filed on Feb. 25, 2022 and Taiwan Patent Application No.111125360 filed on Jul. 6, 2022. The contents of the prior applications are incorporated herein by their entirety.

BACKGROUND OF THE INVENTION

1. Field of the Invention

The instant disclosure relates to a polymer composite film and a hot melt adhesive laminate comprising the same, particularly to a polyester composite film and a hot melt adhesive laminate comprising the same.

2. Description of the Prior Arts

As the time changes, the functional requirements of the textile demanded by consumers are gradually increasing. Waterproof functional fabric becomes one of the focused development topics in the textile industry.

The waterproof performance of waterproof functional fabrics is determined by the water pressure resistance, also called waterproof coefficient. Water pressure resistance, in unit of millimeter of water column (mm $H_2O$), refers to the hydrostatic pressure that the cloth can withstand without water penetration. The higher the value of water pressure resistance, the better the waterproof performance of the fabrics. Generally, the water pressure resistance of 1000 mm $H_2O$ or more indicates the waterproof performance is okay, the water pressure resistance of 3000 mm $H_2O$ or more indicates the waterproof performance is good, and the water pressure resistance of 5000 mm $H_2O$ or more indicates the waterproof performance is excellent. A waterproof functional fabric with water pressure resistance of 5000 mm $H_2O$ or more can be applicable for the weather with light rain to moderate/heavy rain.

Nowadays, waterproof functional fabrics can be made by hot pressing a waterproof film to a fabric or hot pressing a hot melt adhesive film to the seam of two fabrics, and then the waterproof performance of the fabric is improved. Currently the waterproof film or hot melt adhesive film on the market is normally made of polyurethane (PU) or thermoplastic polyurethane (TPU). However, a film made of such materials would be cracked by heat when hot pressed with the fabric, resulting in that the waterproof film or hot melt adhesive film is easily detached from the fabric and therefore the waterproof performance of the fabric is deteriorated.

Therefore, it is still awaited to develop a waterproof film or hot melt adhesive film made of different materials, so as to overcome the drawbacks of the prior art.

SUMMARY OF THE INVENTION

In view of the drawbacks, one of the objectives of the instant disclosure is to provide a polyester composite film different from current films. The polyester composite film can be well attached onto a fabric so that the fabric attached with the polyester composite film, abbreviated as an attached fabric hereinafter, can possess excellent waterproof performance.

To achieve the aforesaid objective, the instant disclosure provides a polyester composite film, which comprises a first thermoplastic polyether ester elastomer (TPEE) film and a second TPEE film. The first TPEE film includes a first TPEE resin, and the second TPEE film includes a second TPEE resin. A melting point of the second TPEE resin of the second TPEE film is higher than that of the first TPEE resin of the first TPEE film, and an absolute difference between an enthalpy of fusion ($\Delta$Hm) of the first thermoplastic polyether ester elastomer film and an enthalpy of fusion of the second thermoplastic polyether ester elastomer film is more than or equal to 5 J/g and less than or equal to 15 J/g.

By adopting the first and second TPEE films having absolute difference in enthalpy of fusion therebetween being 5 J/g to 15 J/g and controlling the melting point of the second TPEE resin to be higher than that of the first TPEE resin, the polyester composite film of the instant disclosure can be well attached onto the fabrics by hot pressing through the first TPEE film to obtain sufficient peel strength; in addition, the second TPEE film would not be melted by high temperature and the film quality of the second TPEE films can be maintained after hot pressing, making the attached fabric have excellent waterproof performance. In short, the polyester composite film of the instant disclosure can exhibit excellent peel strength and waterproof ability when it is applied to attach to the fabric, and thus it is suitable for the waterproof functional cloths.

In accordance with the instant disclosure, the absolute difference in enthalpy of fusion between the first TPEE film and the second TPEE film may be 5 J/g, 6 J/g, 7 J/g, 8 J/g, 9 J/g, 10 J/g, 11 J/g, 12 J/g, 13 J/g, 14 J/g, or 15 J/g. Besides, the absolute difference in enthalpy of fusion between the first and second TPEE films may fall within the ranges between any two of the above values. In one embodiment, the absolute difference in enthalpy of fusion between the first TPEE film and the second TPEE film may be 6 J/g to 15 J/g.

The enthalpy of fusion of the first TPEE film may be 1 J/g, 2 J/g, 3 J/g, 4 J/g, 5 J/g, 6 J/g, 7 J/g, 8 J/g, 9 J/g, or 10 J/g. Besides, the enthalpy of fusion of the first TPEE film may fall within the ranges between any two of the above values. In one embodiment, the enthalpy of fusion of the first TPEE film may be 1 J/g to 10 J/g. In another embodiment, the enthalpy of fusion of the first TPEE film may be 3 J/g to 10 J/g.

The enthalpy of fusion of the second TPEE film may be 5 J/g, 6 J/g, 7 J/g, 8 J/g, 9 J/g, 10 J/g, 11 J/g, 12 J/g, 13 J/g, 14 J/g, 15 J/g, 16 J/g, 17 J/g, 18 J/g, 19 J/g, 20 J/g, 21 J/g, 22 J/g, 23 J/g, 24 J/g, or 25 J/g. Besides, the enthalpy of fusion of the second TPEE film may fall within the ranges between any two of the above values. In one embodiment, the enthalpy of fusion of the second TPEE film may be 5 J/g to 25 J/g. In another embodiment, the enthalpy of fusion of the second TPEE film may be 6 J/g to 25 J/g.

In accordance with the instant disclosure, the first TPEE resin of the first TPEE film and the second TPEE resin of the second TPEE film may be prepared from condensation reaction of dimethyl terephthalate (DMT), 1,4-butanediol (BDO), m-phthalic acid (IPA), and poly(tetramethylene ether) glycol (PTMEG), but it is not limited thereto. For instance, antioxidant such as 1,3,5-trimethyl-2,4,6-tris(3,5-di-tert-butyl-4-hydroxybenzyl)benzene (AO330) or catalyst such as titanium butoxide (TBT) may be optionally added in the preparation.

The melting point of the first TPEE resin may be 90° C., 95° C., 100° C., 105° C., 110° C., 115° C., 120° C., 125° C., 130° C., 135° C., 140° C., 145° C., 150° C., 155° C., 160° C., or 164° C. Besides, the melting point of the first TPEE resin may fall within the ranges between any two of the above values. In one embodiment, the melting point of the first TPEE resin may be 90° C. to 164° C. In another embodiment, the melting point of the first TPEE resin may be 100° C. to 160° C.

The melting point of the second TPEE resin is higher than the melting point of the first TPEE resin. The melting point of the second TPEE resin may be 165° C., 170° C., 175° C., 180° C., 185° C., 190° C., 195° C., 200° C., 205° C., 210° C., 215° C., or 220° C. Besides, the melting point of the second TPEE resin may fall within the ranges between any two of the above values. In one embodiment, the melting point of the second TPEE resin may be 165° C. to 220° C. In another embodiment, the melting point of the second TPEE resin may be 165° C. to 210° C.

The specific gravity of the first TPEE resin or the second TPEE resin may be 1.00, 1.01, 1.02, 1.03, 1.04, 1.05, 1.06, 1.07, 1.08, 1.09, 1.10, 1.11, 1.12, 1.13, 1.14, or 1.15. Besides, the specific gravities of the first TPEE resin and the second TPEE resin may each independently fall within the ranges between any two of the above values. In one embodiment, the specific gravities of the first TPEE resin and the second TPEE resin may each independently be 1.00 to 1.15.

The Shore hardness of the first TPEE resin or the second TPEE resin may be 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45. Besides, the Shore hardness of the first TPEE resin and the second TPEE resin may each independently fall within the ranges between any two of the above values. In one embodiment, the Shore hardness of the first TPEE resin and the Shore hardness of the second TPEE resin may each independently be 15 to 45. In another embodiment, the Shore hardness of the first TPEE resin may be 15 to 30. In further another embodiment, the Shore hardness of the second TPEE resin may be 25 to 45. In still further another embodiment, the Shore hardness of the second TPEE resin may be higher than the Shore hardness of the first TPEE resin.

In addition, another objective of the instant disclosure is to provide a hot melt adhesive laminate. The hot melt adhesive laminate can be well attached to a fabric by hot pressing, which makes the attached fabric have sufficient peel strength between the fabric and the laminate and allows the attached fabric to have excellent waterproof performance.

To achieve the aforesaid objective, the instant disclosure provides a hot melt adhesive laminate, which comprises aforesaid polyester composite film and a release film. The second TPEE film of the polyester composite film is disposed between the first TPEE film and the release film.

When attaching the hot melt adhesive laminate to a fabric, the first TPEE film of the hot melt adhesive laminate is disposed in contact with the fabric. Since the melting point of the first TPEE resin of the first TPEE film is lower than that of the second TPEE resin of the second TPEE film, only a temperature within the melting points of the first and second TPEE resins is required to melt the first TPEE film, and makes the first TPEE film well attached to the fabric. Besides, the hot pressing temperature would not deteriorate the film quality of the second TPEE film, such that the waterproof performance of the attached fabric can be ensured at the same time.

According to the instant disclosure, the release film may be, but is not limited to, polyethylene (PE) release film, polyethylene terephthalate (PET) release film, or oriented polypropylene (OPP) release film.

The fabric applicable to the instant disclosure is not particularly limited. General knitted fabrics, woven fabrics or non-woven fabrics are all applicable to the instant disclosure. In addition, the hot melt adhesive laminate can be attached to the fabric with a large area by hot pressing to form one piece waterproof fabric. Alternatively, the hot melt adhesive laminate can be attached to the seam of the fabric by hot pressing, so as to improve the waterproof performance of the sewn fabric and prevent the water leakage at the seam.

DETAILED DESCRIPTION OF THE PREFERRED EMBODIMENTS

Figure 1:
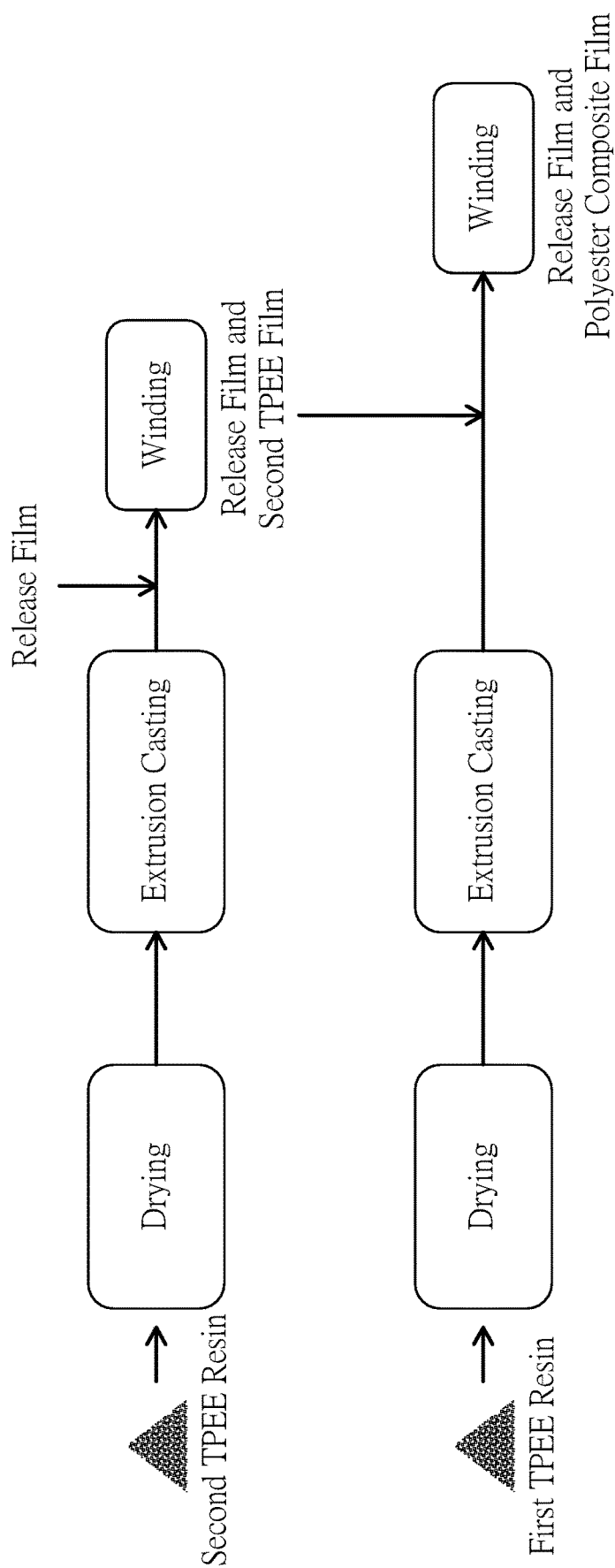
FIG. 1 is a schematic flow diagram of preparing a polyester composite film and a hot melt adhesive laminate.

Hereinafter, several preparation examples and examples are described to illustrate the embodiments of a polyester composite film and a hot melt adhesive laminate comprising the same, and several comparative examples are provided for comparison. One person having ordinary skill in the art can easily realize the advantages and effects of the present invention from the following examples and comparative examples. It should be understood that the descriptions proposed herein are just preferable examples for the purpose of illustrations only, not intended to limit the scope of the instant disclosure. One person having ordinary skill in the art can make various modifications and variations to practice or apply the instant disclosure in accordance with the ordinary knowledge without departing from the spirit and scope of the instant disclosure.

Thermoplastic Polyether Ester Elastomer Resin (TPEE Resin)

Preparation Example 1: TPEE Resin Pellets

First, according to the weights in Table 1, 10 kilograms (kg) of dimethyl terephthalate (DMT), 10 kg of 1,4-butanediol (BDO), 3.43 kg of m-phthalic acid (IPA), 22 kg poly (tetramethylene ether) glycol (PTMEG), 70 grams (g) of 1,3,5-trimethyl-2,4,6-tris(3,5-di-tert-butyl-4-hydroxybenzyl)benzene (AO330) were respectively weighed and charged into a 3-liter autoclave. After that, 70 grams of titanium butoxide (TBT) were added into the autoclave. Then the temperature of the heating plate of the autoclave was set to be 210° C. to 230° C. to carry out the esterification reaction. The PTMEG in the instant preparation example had a number average molecular weight (Mn) of 1000 and is represented by "PTMEG 1000" in the following Table 1.

Methanol (MeOH, boiling point: 64.7° C.) and water ($H_2O$, boiling point: 100° C.) were produced as byproducts during the esterification reaction and boiled in the autoclave at 220° C. to 225° C. Then methanol and water were condensed in a condenser tube connected to the autoclave and collected in a condensate collection tank. When the temperature of the top of the condenser tube was decreased to 40° C. or lower, the esterification reaction was regarded as completed, and a polycondensation stage followed immediately.

At the polycondensation stage, the temperature of the autoclave was increased to 240° C. to 250° C., and the pressure of the autoclave was reduced to 1 millibar (mbar) or lower by turning on a vacuum pump. After that, the temperature and the pressure were maintained for about 200 minutes (min). When the melt flow index of the copolymer in the autoclave reached 15 g/10 min to 20 g/10 min, the polycondensation reaction was regarded as completed. The valve at the bottom of the autoclave could be unscrewed to carry out the subsequent process of drawing strands and cutting strands into pellets. Herein, the melt flow index is referred to the weight of the copolymer flowing through a standard die having a diameter of 2.095 mm in 10 minutes, which was measured at 190° C. with 2.16 kg load.

At last, an underwater cutting equipment was equipped at the opening at the bottom of the autoclave, and the strands were cut with the cutter rotating speed of 2000 revolutions per minute (rpm), die head temperature of 230° C., water temperature for pellet cutting of 10° C., and gear pump output of 50 kilograms per hour (kg/hr). After cutting, circular pellets with a diameter of about 3 mm were obtained. The circular pellets were cooled and crystalized in cold water bath, and water was removed by a hydro extractor machine, so as to obtain the product (i.e., TPEE resin pellets).

Preparation Examples 2 to 12: TPEE Resin Pellets

The process of preparing TPEE resin pellets of Preparation Examples 2 to 12 were almost the same as Preparation Example 1, except for the weights of raw materials including DMT, BDO, IPA, AO300, and TBT as well as Mn and weight of PTMEG.

Herein, the PTEMG adopted in each preparation example had slightly different Mn. As specified above, PTMEG having Mn of 1000 is represented by "PTMEG 1000" while PTMEG having Mn of 2000 is represented by "PTMEG 2000" in the following Table 1.

The theoretical yield by weight ($W_{theor}$) of TPEE resin pellets of Preparation Examples 1 to 12 could be calculated with the following equation:

$$W_{theor} = W_{DMT} + W_{PTMEG} + W_{IPA} + W_{TBT} + W_{AO300}$$
$$+ [(W_{DMT}/M_{DMT}) + (W_{IPA}/M_{IPA})$$
$$- (W_{PTMEG}/M_{PTMEG})] \times M_{BDO}$$
$$- [W_{DMT}/M_{DMT} \times 2 \times M_{MeOH}]$$
$$- [(W_{IPA}/M_{IPA}) \times 2 \times M_{H_2O}]$$

In the above equation,
$W_{theor}$: theoretical yield by weight;
$W_{DMT}$: weight of DMT;
$W_{PTMEG}$: weight of PTMEG;
$W_{IPA}$: weight of IPA;
$W_{TBT}$: weight of TBT;
$W_{AO300}$: weight of AO300;

$M_{DMT}$: molecular weight of DMT: 194 g/mol;
$M_{IPA}$: molecular weight of IPA: 166 g/mol;
$M_{PTMEG}$: molecular weight of PTMEG;
$M_{BDO}$: molecular weight of BDO: 90 g/mol;
$M_{MeOH}$: molecular weight of MeOH: 32 g/mol; and
$M_{H2O}$: molecular weight of $H_2O$: 18 g/mol.

Besides, the percentages of usage of PTMEG and IPA could be calculated according to the following equations:

Percentage of Usage of PTMEG(%)=($W_{PTMEG}$/$W_{theor}$)×100%

Percentage of Usage of IPA(%)=($W_{IPA}$/$W_{theor}$)×100%

The theoretical yield by weight of TPEE resin pellets, the percentage of usage of PTMEG, and the percentage of usage of IPA of the Preparation Examples 1 to 12, which were calculated according to the above equations, were listed in Table 1 below.

In addition to the embodiments exemplified in the abovementioned preparation examples, one person having ordinary skill in the art can make adjustments, modifications and changes to the abovementioned process without departing from the spirit of the instant disclosure to obtain the applicable TPEE resin pellets of the instant disclosure. For instance, the weight of each raw material or the timing of adding catalyst in the process could be modified depending on different needs. For instance, a catalyst could be additionally added at polycondensation stage to accelerate the reaction. That is, the timing of adding catalyst was not limited to the initial esterification stage.

Test Example 1: Melting Point

The abovementioned TPEE resin pellets of Preparation Examples 1 to 12 were used as test samples. An aluminum tray with 10 mg of test sample and a blank aluminum tray were placed at a differential scanning calorimeter (DSC, manufacturer: TA Instrument, model: Q-2000). The temperature of the differential scanning calorimeter was raised at the speed of 10° C./min from room temperature to the melting peak appeared, and the melting point of TPEE resin pellets of each preparation example was recorded. The results are listed in Table 2.

Test Example 2: Specific Gravity

The abovementioned TPEE resin pellets of Preparation Examples 1 to 12 were used as test samples, and the specific gravity was measured according to ISO1183 standard method.

Specifically, the weight of each test sample, expressed in "a" (unit: grams), was weighed in air with a balance and rounded off to the four decimal places. The weight of a thin steel wire in water was reset to zero after the thin steel wire was hung on a hook and immersed into a beaker filled with water on the balance. After that, the test sample was hooked by the thin steel wire and then immersed into the beaker filled with water through the hook on the balance to make the test sample fully immersed in water. Bubbles on the test sample were carefully removed. The weight of the test sample immersed in water, expressed in "b" (unit: grams), was weighed, and round off to the four decimal places. At last, the specific gravity of each test sample was calculated with the equation of a/(a−b). Results are listed in Table 2.

The specific gravity of TPEE resin pellets of Preparation Examples 1 to 12 was 1.00 to 1.15.

Test Example 3: Shore Hardness

The abovementioned TPEE resin pellets of Preparation Examples 1 to 12 were used as test samples and measured by using a hardness tester (DSC, manufacturer: Bareiss Germany, model: digi test II) according to ISO868 standard method to obtain the Shore hardness.

Specifically, the TPEE resin pellets of each preparation example were injection molded to prepare a test specimen having a thickness of at least 4 mm. The hardness tester was switched on, and the weight and the probe set up at their positions were confirmed. After entering the FUNC page and selecting the Std.PV mode, the test specimen was placed onto the platform, and the target measuring point should be at least 9 mm away from the border of the test specimen. The start button was pressed to perform measurement, and the value displayed on the tester after waiting for 3 seconds was the Shore hardness of TPEE resin pellets. As shown in the following Table 2, the Shore hardness of TPEE resin pellets of Preparation Examples was 15 to 45.

two TPEE films. The embodiments of the polyester composite film and the hot melt adhesive laminate were described below.

Example 1

In Example 1, the abovementioned TPEE resin pellets of Preparation Example 1 were used as the first TPEE resin and the abovementioned TPEE resin pellets of Preparation Example 6 were used as the second TPEE resin to prepare the first TPEE film and the second TPEE film according to the following method, and the polyester composite film and the hot melt adhesive laminate could be obtained.

As shown in FIG. 1, 20 kg to 25 kg of the second TPEE resin (high melting point TPEE resin pellets) was placed into a crystallization dryer, and the temperature was set at 100° C. to 120° C. for crystallization and drying for at least 4 hours to 8 hours. Then the high melting point TPEE resin pellets were introduced into a metering extruder with dry air. The extruder speed was set to 10 rpm to 50 rpm and the temperature of each zone of its extrusion screw was set at 150° C. to 230° C., so that the high melting point TPEE resin pellets were melted into a high melting point TPEE molten

TABLE 1 weights of the used raw materials, theoretical yield by weight, and percentage of usage of PTMEG and IPA of the preparation of TPEE resin pellets of Preparation Example 1 (PE1) to Preparation Example 12 (PE12)

|  | PE1 | PE2 | PE3 | PE4 | PE5 | PE6 | PE7 | PE8 | PE9 | PE10 | PE11 | PE12 |
|---|---|---|---|---|---|---|---|---|---|---|---|---|
| Weight of DMT (kg) | 10 | 17.08 | 7.75 | 10 | 11 | 12 | 15.75 | 7.6 | 8.75 | 9.65 | 10.5 | 7.95 |
| Weight of BDO (kg) | 10 | 11.9 | 5.5 | 6 | 8.2 | 7.5 | 10.25 | 7.6 | 10 | 8.5 | 8.5 | 6.5 |
| Weight of IPA (kg) | 3.43 | 0 | 0 | 0 | 0 | 0 | 0 | 3.45 | 4.5 | 2.4 | 1.75 | 0 |
| Weight of PTMEG1000 (kg) | 22 | 33.6 | 0 | 0 | 0 | 0 | 0 | 23 | 19 | 22 | 22 | 0 |
| Weight of PTMEG2000 (kg) | 0 | 0 | 28 | 27 | 20.6 | 19.6 | 17.5 | 0 | 0 | 0 | 0 | 25 |
| Weight of AO 330 (g) | 70 | 100 | 72 | 75 | 65 | 65 | 70 | 70 | 67.5 | 70 | 70 | 67.5 |
| Weight of TBT (g) | 70 | 100 | 72 | 75 | 65 | 65 | 70 | 70 | 67.5 | 70 | 70 | 67.5 |
| Theoretical Yield by Weight (kg) | 36.05 | 50.15 | 35.68 | 37.28 | 32.29 | 32.46 | 34.72 | 34.25 | 33.3 | 34.25 | 34.35 | 33 |
| Percentage of Usage of PTMEG(%) | 61 | 67 | 78.5 | 72.4 | 63.8 | 60.3 | 50.4 | 67 | 57 | 64 | 64 | 75.7 |
| Percentage of Usage of IPA(%) | 9.5 | 0 | 0 | 0 | 0 | 0 | 0 | 10 | 13.5 | 7 | 5 | 0 |

TABLE 2 melting point, specific gravity and Shore hardness of TPEE resin pellets of PE1 to PE12

|  | PE1 | PE2 | PE3 | PE4 | PE5 | PE6 | PE7 |
|---|---|---|---|---|---|---|---|
| Melting Point (° C.) | 110 | 140 | 152 | 167 | 185 | 190 | 207 |
| Specific Gravity | 1.1023 | 1.0921 | 1.0443 | 1.0686 | 1.0825 | 1.1078 | 1.1335 |
| Shore Hardness | 20 | 28 | 23 | 26 | 30 | 33 | 40 |

|  | PE8 | PE9 | PE10 | PE11 | PE12 |
|---|---|---|---|---|---|
| Melting Point (° C.) | 94 | 101 | 118 | 126 | 160 |
| Specific Gravity | 1.0804 | 1.1133 | 1.0939 | 1.1016 | 1.0581 |
| Shore Hardness | 18 | 19 | 19 | 21 | 20 |

Polyester Composite Film and Hot Melt Adhesive Laminate

Please refer to FIG. 1: two TPEE resins of different properties (the first TPEE resin and the second TPEE resin) were used in combination to respectively form two TPEE films of different properties (the first TPEE film and the second TPEE film). A desired polyester composite film and a desired hot melt adhesive laminate were obtained by controlling the melting points of the these two TPEE resins and the absolute difference of the enthalpy of fusion between slurry by the heating temperature of the extruder and the shear friction heat produced by the stifling screw. Then the high melting point TPEE molten slurry was extruded through an extrusion die head, whose temperature of each zone was set and kept at 190° C. to 230° C., and subjected to an extrusion casting process.

At this moment, a continuous PET release film having releasing force of 250 g to 1500 g was placed at one side of a casting machine. After the high melting point TPEE molten slurry was cast out through the extrusion die head, the release film was passed the space between a pressing roller and a cooling roller, and the lamination zone was located under the mold that the high melting point TPEE molten slurry was taken and laminated into a high melting point TPEE film. The high melting point TPEE film was then extended by one or more series of ripening rollers at a temperature of 5° C. to 30° C. and a speed of 1 rpm to 10 rpm Finally, the release film and the high melting point TPEE film (i.e., the second TPEE film) thereon were obtained and wound by a winding roller at a winding speed of 1 rpm to 10 rpm.

20 kg to 25 kg of the first TPEE resin (low melting point TPEE resin pellets) was placed into a crystallization dryer, and the temperature was set at 60° C. to 120° C. for crystallization and drying for at least 4 hours to 8 hours. Then the low melting point TPEE resin pellets were introduced into a metering extruder with dry air. The extruder speed was set to 10 rpm to 50 rpm and the temperature of each zone of its extrusion screw was set at 100° C. to 210° C., so that the low melting point TPEE resin pellets were melted into a low melting point TPEE molten slurry by the heating temperature of the extruder and the shear friction heat produced by the stifling screw. Then the low melting point TPEE molten slurry was extruded through an extrusion die head, whose temperature of each zone was set and kept at 140° C. to 210° C., and subjected to an extrusion casting process.

At this moment, the abovementioned continuous PET release film and high melting point TPEE film were placed at one side of a casting machine. After the low melting point TPEE molten slurry was cast out through the extrusion die head, the release film and high melting point TPEE film were passed the space between a pressing roller and a cooling roller, and the lamination zone was located under the mold where the low melting point TPEE molten slurry was taken and laminated into a low melting point TPEE film (i.e., the first TPEE film). The low melting point TPEE film was then extended by one or more series of ripening rollers at a temperature of 5° C. to 30° C. and a speed of 1 rpm to 10 rpm. Finally, the release film, the high melting point TPEE film, and the low melting point TPEE film were obtained and wound together by a winding roller at a winding speed of 1 rpm to 10 rpm, and a polyester composite film formed on the release film was obtained. The release film and the polyester composite film composed the hot melt adhesive laminate.

Figure 2:
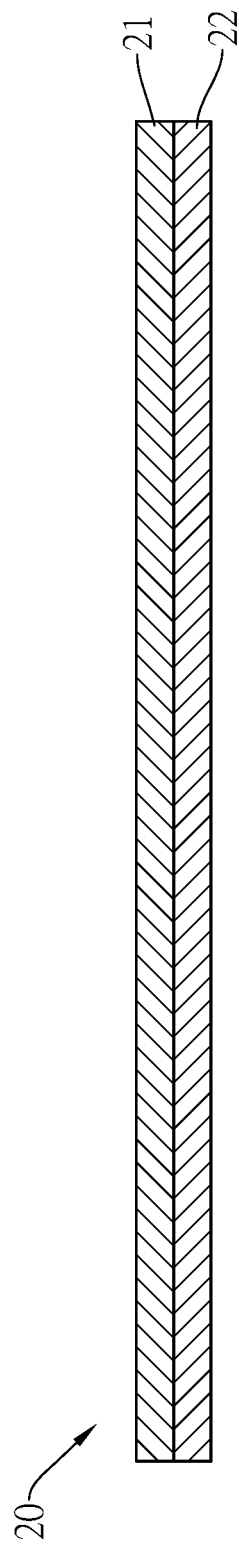
FIG. 2 is a schematic side view of the polyester composite film.

As shown in FIG. 2, the polyester composite film 20 comprised a first thermoplastic polyether ester elastomer film 21 and a second thermoplastic polyether ester elastomer film 22 disposed on the first thermoplastic polyether ester elastomer film 21. The first thermoplastic polyether ester elastomer film 21 includes a material of a first thermoplastic polyether ester elastomer resin, and the second thermoplastic polyether ester elastomer film 22 includes a material of a second thermoplastic polyether ester elastomer resin.

Figure 3:
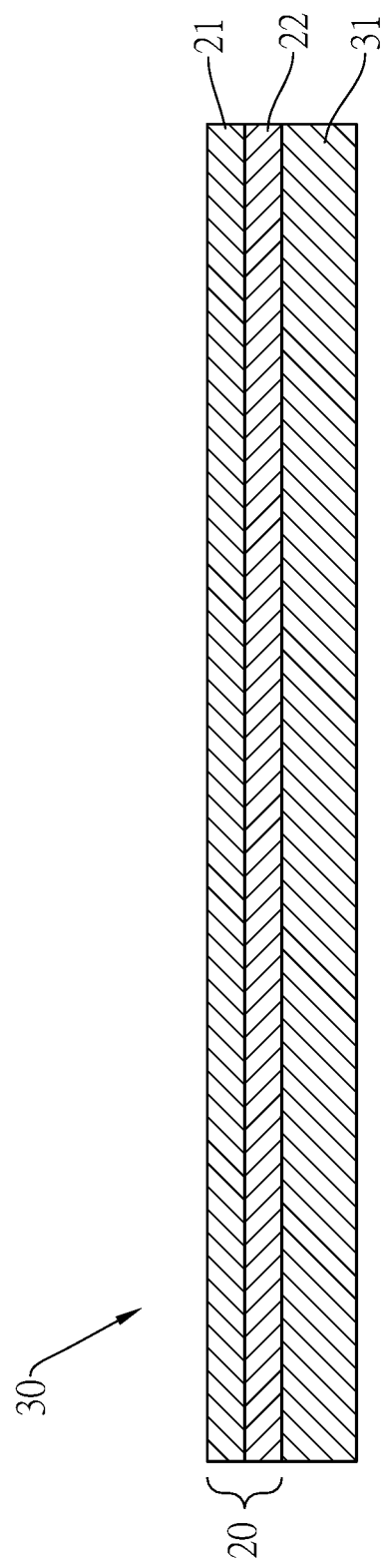
FIG. 3 is a schematic side view of the hot melt adhesive laminate.

As shown in FIG. 3, the hot melt adhesive laminate 30 comprises the abovementioned polyester composite film 20 and a release film 31, and the polyester composite film 20 is disposed on the release film 31. Specifically, the second thermoplastic polyether ester elastomer film 22 of the polyester composite film 20 is disposed between the first thermoplastic polyether ester elastomer film 21 of the polyester composite film 20 and the release film 31.

Examples 2 to 7 and Comparative Examples 1 to 3

The process of preparing the polyester composite films and hot melt adhesive laminates of Examples 2 to 7 and Comparative Examples 1 to 3 were almost the same as Example 1, except for the sources and the melting points of the first and second TPEE resins used in the preparation. Data are listed in Tables 2 to 4.

As stated above, the structures of the polyester composite films of Examples 2 to 7 and Comparative Examples 1 to 3 are illustrated in FIGS. 2, and the structures of the hot melt adhesive laminates of Examples 2 to 7 and Comparative Examples 1 to 3 are illustrated in FIG. 3. Based on the source difference of the adopted first and second TPEE resins, the difference between Examples 1 to 7 and Comparative Examples 1 to 3 are described below.

Test Example 4: Enthalpy of Fusion

The polyester composite films of Examples 1 to 7 and Comparative Examples 1 to 3 as objects to be analyzed were each split into two test samples according to the following method, and then the respective enthalpy of fusion of two test samples was measured.

First, the polyester composite film with a size of 10 cm in length and 4 cm in width was immersed in a 25 ml vial filled with 15 ml of acetone for one day. After taking the immersed polyester composite film out of the vial, the first TPEE film and the second TPEE film of the polyester composite film were separated from each other by using a tool such as scissors or a utility knife, and two test samples (the first TPEE film and the second TPEE film) were obtained.

Next, an aluminum tray with 10 mg of test sample and a blank aluminum tray were placed at a differential scanning calorimeter (DSC, manufacturer: TA Instrument, model: Q-2000). The temperature of the differential scanning calorimeter was raised at the speed of 10° C./min from room temperature to the melting peak appeared. After that, the temperature of the differential scanning calorimeter was cooled down at the speed of 10° C./min to room temperature. The enthalpy of fusion of each test sample was calculated by the area between two curves, one of aforesaid curves started at the starting point and ended at the melting peak, and the other started at the melting peak and ended at the ending point. Results are listed in Table 3. For analysis of each polyester composite film, the enthalpy of fusion of the first TPEE film is represented by "$\Delta H_{1st}$" in the following Table 3, and the enthalpy of fusion of the second TPEE film is represented by "$\Delta H_{2nd}$" in the following Table 3. The absolute difference between the enthalpies of fusion of the first TPEE film and the enthalpy of fusion of the second TPEE film of each polyester composite film is represented by "$|\Delta H_{2nd}-\Delta H_{1st}|$" in the following Tables 3 and 4.

As shown in Tables 3 and 4, for the polyester composite films of Examples 1 to 7, the melting point of the second TPEE resin in the polyester composite film was higher than that of the first TPEE resin, and its "$|\Delta H_{2nd}-\Delta H_{1st}|$" was 5 J/g to 15 J/g. However, for the polyester composite films of Comparative Examples 1 to 3, the melting point of the second TPEE resin was higher than that of the first TPEE resin but its "$|\Delta H_{2nd}-\Delta H_{1st}|$" was out the range within 5 J/g and 15 J/g. Specifically, the enthalpies of fusion of the first and second TPEE films in the polyester composite films of Comparative Examples 1 to 3 were much close to each other, so that "$|\Delta H_{2nd}-\Delta H_{1st}|$" was less than 5 J/g. On the other hand, for Comparative Example 2, the first and the second TPEE films had excessive difference in the enthalpy of fusion, so that "$|\Delta H_{2nd}-\Delta H_{1st}|$" was over 15 J/g.

Use of Polyester Composite Film and Hot Melt Adhesive Laminate

The polyester composite film and the hot melt adhesive laminate of the instant disclosure possess sufficient peel strength when they are attached onto a fabric, such that they can be well attached onto the fabric that endows the fabric with excellent waterproof performance. To verify the effects that the polyester composite film or the hot melt adhesive laminate of the instant disclosure is applied to the fabric, the peel strength and waterproof performance are evaluated in the following Test Examples 5 and 6, and the test results are described in combination as below.

Test Example 5: Peel Strength

In the instant test example, the abovementioned hot melt adhesive laminates of Examples 1 to 7 and Comparative Examples 1 to 3 were used. The hot melt adhesive laminate was disposed on a woven fabric after peeling off the release film thereof, and then subjected to hot pressing, water washing, standing still as described below, so as to obtain the test sample. After that, the peel strength between the polyester composite film and the woven fabric was measured according to ISO2411 standard method by using the tensile testing machine (manufacturer: INSTRON, model: 3345). The detailed preparation method of each test sample was described below.

First, 9 pieces of test woven fabrics each covered with a TPU waterproof film thereon and having a size of at least 200 mm in length and at least 75 mm in width were provided. The polyester composite film with a length of at least 200 mm (width not limited) was disposed on the woven fabric, wherein the first TPEE film of the polyester composite film was in contact with the waterproof film of the woven fabric. Then the hot pressing temperature of one side of the hot press machine was set at 175° C. and the hot pressing pressure was set at 3.0 kilograms per centimeter square (kg/cm²). The polyester composite film and the waterproof film were hot pressed with the hot press machine for a while to obtain a hot pressed laminate. Herein, 3 pieces of the foresaid 9 pieces of test woven fabrics were each hot pressed with the polyester composite films for 20 seconds, another 3 pieces of the foresaid 9 pieces of test woven fabrics were each hot pressed with the polyester composite films for 30 seconds, and the rest 3 pieces of the test woven fabrics were each hot pressed with the polyester composite films for 40 seconds. A part (100 mm in length) of the polyester composite film was hot pressed onto the woven fabric, and one end of the polyester composite film was left free and not hot pressed onto the fabric, for convenience of holding by the clamp in the tensile testing machine. The hot pressed laminates were left still for 24 hours to ripen the polyester composite film.

Figure 4:
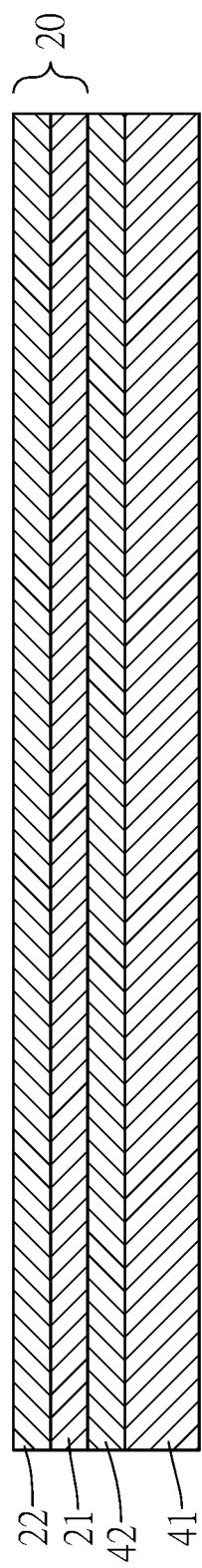
FIG. 4 is a schematic side view of a hot pressed laminate in Test Example 5.

As shown in FIG. 4, the hot pressed laminate comprises a woven fabric 41, a waterproof film 42, and the foresaid polyester composite film 20. The waterproof film 42 is formed on the woven fabric 41, and the polyester composite film 20 is attached on the waterproof film 42 by the first TPEE film 21. That is, the first thermoplastic polyether ester elastomer film 21 is disposed between the waterproof film 42 and the second thermoplastic polyether ester elastomer film 22.

After that, the hot pressed laminates were each placed into a washing machine with test fabrics which made the total weight of items put in the washing machine reach 1.8 kg±0.1 kg, and then washed with 66.0 g±1 g of AATCC 1993 standard reference detergent dissolved in 18.0 gallons±0.5 gallons of water at 60° C.±3° C. for 12 min at a stirring speed of 179 rpm±2 rpm, and then dried off at a spinning speed of 645 rpm±15 rpm for 6 min. The foresaid hot pressed laminate and test fabrics were washed and dried off repeatedly for 50 times, left still for 24 hours, and then test sample was obtained.

TABLE 3 sources and melting points (M.P.) of the first and second TPEE resins, the enthalpy of fusion of the first TPEE film ($\Delta H_{1st}$), the enthalpy of fusion of the second TPEE film ($\Delta H_{2nd}$), and the absolute difference in the enthalpy of fusion between the first and the second TPEE films ($|\Delta H_{2nd} - \Delta H_{1st}|$) of Examples 1 to 7 (E1 to E7) and Comparative Examples 1 to 3 (CE1 to CE3)

| | First TPEE film | | | Second TPEE Film | | | |
|---|---|---|---|---|---|---|---|
| | Source of First TPEE Resin | M.P. of First TPEE Resin | $\Delta H_{1st}$ | Source of Second TPEE Resin | M.P. of Second TPEE Resin | $\Delta H_{2nd}$ | $|\Delta H_{2nd} - \Delta H_{1st}|$ |
| E1 | PE1 | 110° C. | 3.04 J/g | PE6 | 190° C. | 15.39 J/g | 12.35 J/g |
| E2 | PE2 | 140° C. | 7.77 J/g | PE6 | 190° C. | 15.39 J/g | 7.62 J/g |
| E3 | PE8 | 94° C. | 1.4 J/g | PE4 | 167° C. | 7.67 J/g | 6.27 J/g |
| E4 | PE9 | 101° C. | 5.1 J/g | PE6 | 190° C. | 15.39 J/g | 10.29 J/g |
| E5 | PE10 | 118° C. | 4.9 J/g | PE6 | 190° C. | 15.39 J/g | 10.49 J/g |
| E6 | PE11 | 126° C. | 6.0 J/g | PE7 | 207° C. | 20.51 J/g | 14.51 J/g |
| E7 | PE12 | 160° C. | 3.6 J/g | PE6 | 190° C. | 15.39 J/g | 11.79 J/g |
| CE1 | PE2 | 140° C. | 7.77 J/g | PE4 | 167° C. | 7.67 J/g | 0.1 J/g |
| CE2 | PE3 | 152° C. | 3.79 J/g | PE7 | 207° C. | 20.51 J/g | 16.72 J/g |
| CE3 | PE5 | 185° C. | 16.73 J/g | PE7 | 207° C. | 20.51 J/g | 3.78 J/g |

Finally, the test sample was fixed by the upper and lower clamps of the tensile testing machine, in which the upper clamp held the free end of the woven fabric of the test sample and the lower clamp held the free end of the polyester composite film of the test sample (the items held by the upper and lower clamps were exchangeable). The upper and lower clamps had a size of 6 inches*2 inches, and the distance between the upper and lower clamps was 50 mm. Then the stripping clamp of the tensile testing machine moved at a constant extension rate of 100 millimeters per minute (mm/min)±10 mm/min applied with an appropriate range of stress load until the polyester composite film separated from the woven fabric. The maximum stress detected at the moment of separation was recorded as the peel strength between the polyester composite film and the woven fabric, unit: kilograms per centimeter (kgf/cm). The results of averaging the peel strengths of 3 test samples that were hot pressed for 20 seconds are listed in Table 4. Similarly, the results of averaging the peel strengths of 3 test samples that were hot pressed for 30 seconds and the results of averaging the peel strengths of 3 test samples that were hot pressed for 40 seconds are also listed in Table 4.

As shown in Table 4, the peel strengths between the polyester composite films of Examples 1 to 7 and the fabrics were all greatly higher than those between Comparative Examples 1 to 3 and the fabrics after hot pressing for 20, 30, or 40 seconds, which indicates that the polyester composite films of Examples 1 to 7 could be well attached to the fabric and the unexpected separation could be avoided.

In the group of hot pressing for 20 seconds, the peel strengths between the polyester composite films of Examples 1 to 7 and fabrics were more than 0.65 kgf/cm; specifically, the peel strengths between the polyester composite films of Examples 1 to 7 and fabrics were 0.68 kgf/cm to 1.50 kgf/cm. In the group of hot pressing for 30 seconds, the peel strengths between the polyester composite films of Examples 1 to 7 and fabrics were more than 0.68 kgf/cm; specifically, the peel strengths between the polyester composite films of Examples 1 to 7 and fabrics were 0.70 kgf/cm to 1.75 kgf/cm. In the group of hot pressing for 40 seconds, the peel strengths between the polyester composite films of Examples 1 to 7 and fabrics were more than 0.72 kgf/cm; specifically, the peel strengths between the polyester composite films of Examples 1 to 7 and fabrics were 0.85 kgf/cm to 2.00 kgf/cm.

Test Example 6: Waterproof Performance

In the instant test example, the abovementioned hot melt adhesive laminates of Examples 1 to 7 and Comparative Examples 1 to 3 were used. The hot melt adhesive laminate was disposed on two sewn woven fabrics after peeling off the release film thereof, and then subjected to hot pressing, water washing, standing still as described below, so as to obtain the test sample. After that, the water pressure resistance of the fabric attached with the polyester composite film was measured according to ISO811 standard method by using a hydrostatic pressure testing machine (manufacturer: HEZO, model: 322AD). The detailed preparation method of each test sample was described below.

First of all, two pieces of test woven fabrics each having a size of 200 mm to 225 mm in length and 200 mm to 225 mm in width were provided. Flat stitching was sewn at the junction of two test woven fabrics, and the seam was made with folded and pressed edges to make the sewed fabrics contacted and flat at the junction, without forming triangular bulges at the seam in the side view. The upper woven fabric was covered with a TPU waterproof film on its surface.

After peeling off the release film of the hot melt adhesive laminate, the polyester composite film was placed on the seam of the two woven fabrics. The first TPEE film of the polyester composite film was disposed facing the waterproof film on the woven fabric. Then the hot pressing temperature of one side of the hot press machine was set at 175° C. and the hot pressing pressure was set at 3.0 kg/cm². After that, the polyester composite film and two woven fabrics were hot pressed with a hot press machine for 20 seconds, 30 seconds, or 40 seconds, and a hot pressed laminate was obtained.

Figure 5:
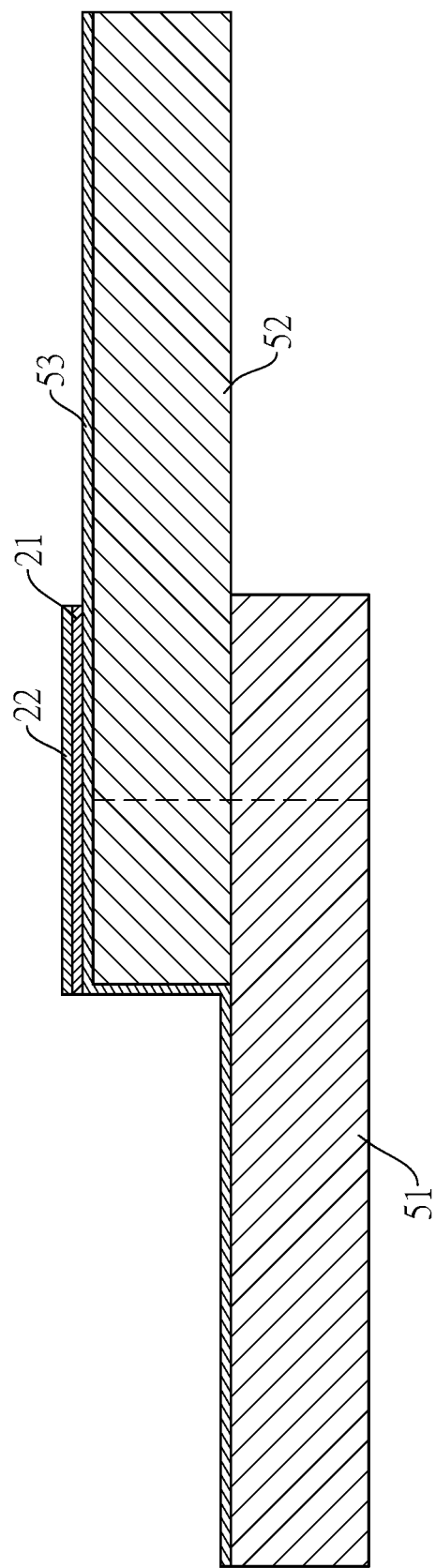
FIG. 5 is a schematic side view of a hot pressed laminate in Test Example 6.

As shown in FIG. 5, the hot pressed laminate of the instant test example comprises a first woven fabric 51, a second woven fabric 52, a waterproof film 53, and a polyester composite film. The first woven fabric 51 and the second woven fabric 52 are sewn and formed into one piece, the waterproof film 53 is formed on the first woven fabric 51 and the second woven fabric 52, and the polyester composite film covers the seam (shown as a dashed line). That is, the polyester composite film is attached with the waterproof film 53 by the first thermoplastic polyether ester elastomer film 21, and the first thermoplastic polyether ester elastomer film 21 of the polyester composite film is disposed between the waterproof film 53 and the second thermoplastic polyether ester elastomer film 22.

After that, the hot pressed laminate was placed into a washing machine with test fabrics which made the total weight of items put in the washing machine reach 1.8 kg±0.1 kg, and then washed with 66.0 g±1 g of AATCC 1993 standard reference detergent dissolved in 18.0 gallons±0.5 gallons of water at 60° C.±3° C. for 12 min at a stirring speed of 179 rpm±2 rpm, and then dried off at a spinning speed of 645 rpm±15 rpm for 6 min. The foresaid hot pressed laminate and test fabrics were washed and dried off repeatedly for 50 times, left still for 24 hours, and then test sample was obtained.

At last, a column of water of the hydrostatic pressure testing machine was pressed against the test sample at the region attached with the polyester and with a water pressure increasing by 100 mmH$_2$O per minute (mmH$_2$O/min)±0.5 mmH$_2$O/min, so as to observe the water leakage and measure the hydrostatic head at the region. The pressure of water stopped increasing when penetrated water drops appeared in 3 places of the surface of the fabric, and the current pressure of water was recorded as the water pressure resistance of the polyester composite film. Results are listed in Table 4. Alternatively, a column of water with set constant water pressure was pressed against the test sample at the region attached with the polyester e.g., 5,000 mmH$_2$O of a column of water was pressed for 120 seconds, and the water leakage was observed. If less than 3 penetrated water drops appeared on the surface of the fabric, the set water pressure was recorded as the water pressure resistance of the polyester composite film.

As shown in Table 4, the polyester composite films of Examples 1 to 7 all provided the attached fabrics a hydrostatic pressure of 5,000 mmH$_2$O or more regardless that they are hot pressed with the fabrics for 20 seconds, 30 seconds, or 40 seconds. This indicated that the polyester composite films of Examples 1 to 7 could give the fabric excellent waterproof performance and make the fabric capable of resisting the light rain or moderate/heavy rain. For Comparative Example 3, since the polyester composite film did not have sufficient peel strength with the fabric, the polyester composite film failed to withstand the water weight during the hydrostatic pressure test, and the water pressure resistance of Comparative Example 3 could not be measured.

TABLE 4 melting points (M.P.) of the first and second TPEE resins and $|\Delta H_{2nd} - \Delta H_{1st}|$
of Examples 1 to 7 (E1 to E7) and Comparative Examples 1 to 3 (CE1 to CE3),
and the peel strength and water pressure resistance of E1 to E7 and CE1
to CE3 that are applied to fabrics by hot pressing for 20, 30, and 40 seconds

|  | M.P. of First TPEE Resin | M.P. of Second TPEE Resin | $|\Delta H_{2nd} - \Delta H_{1st}|$ | Peel Strength (kgf/cm) | | | Water Pressure Resistance (mmH$_2$O) |
|---|---|---|---|---|---|---|---|
|  |  |  |  | 20 sec | 30 sec | 40 sec |  |
| E1 | 110° C. | 190° C. | 12.35 J/g | 1.06 | 1.03 | 1.09 | ≥5,000 |
| E2 | 140° C. | 190° C. | 7.62 J/g | 0.88 | 0.88 | 0.90 | ≥5,000 |
| E3 | 94° C. | 167° C. | 6.27 J/g | 0.7 | 0.85 | 0.88 | ≥5,000 |
| E4 | 101° C. | 190° C. | 10.29 J/g | 1.12 | 1.39 | 1.33 | ≥5,000 |
| E5 | 118° C. | 190° C. | 10.49 J/g | 1.05 | 1.01 | 1.15 | ≥5,000 |
| E6 | 126° C. | 207° C. | 14.51 J/g | 0.68 | 0.7 | 0.92 | ≥5,000 |
| E7 | 160° C. | 190° C. | 11.79 J/g | 1.32 | 1.38 | 1.61 | ≥5,000 |
| CE1 | 140° C. | 167° C. | 0.1 J/g | 0.65 | 0.61 | 0.60 | ≥5,000 |
| CE2 | 152° C. | 207° C. | 16.72 J/g | 0.48 | 0.68 | 0.72 | ≥5,000 |
| CE3 | 185° C. | 207° C. | 3.78 J/g | 0.08 | 0.14 | 0.15 | Not measured. |

Discussion on Experimental Results

As shown in Table 4, the first and second TPEE films were adopted in the polyester composite film of each of Examples 1 to 7, in which the melting point of the second TPEE resin was higher than that of the first TPEE resin and the absolute difference in enthalpy of fusion between the first TPEE film and the second TPEE film was 5 J/g to 15 J/g. Therefore, when the polyester composite films of Examples 1 to 7 were attached with the fabrics by hot pressing, the first TPEE films of the polyester composite films were attached onto the fabric that exhibited excellent peel strength therebetween. In addition, the film quality of the above second TPEE films was maintained and not melted by high temperature of hot pressing, allowing the fabrics attached with the polyester composite films of Examples 1 to 7 to have high water pressure resistance of 5,000 mmH$_2$O or more and exhibit excellent waterproof performance.

In contrast, the peel strengths between the polyester composite films of Comparative Examples 1 and 2 and the fabrics attached by hot pressing were both lower than those of Examples 1 to 7, so the polyester composite films of Comparative Examples 1 and 2 had higher risk of being detached from the fabrics. Particularly, the polyester composite film of Comparative Example 3 had poor peel strength with the attached fabric, which was even not capable of withstanding the water weight applied in the hydrostatic pressure test. Therefore, the polyester composite film of Comparative Example 3 could not be well attached onto the fabric to provide the fabric with required waterproof performance.

Moreover, because the melting point of the second TPEE resin was higher than that of the first TPEE resin, the first TPEE film of the polyester composite film was melted and well attached onto the fabric under a reduced hot pressing temperature, i.e., a temperature between the melting points of the first and second TPEE resins, without melting the second TPEE film. Therefore, the polyester composite film of each of Examples 1 to 7 could be well attached with the fabric by hot pressing through the first TPEE film at low hot pressing temperature, offering the fabric with excellent waterproof performance.

In summary, by means of adopting the first TPEE film and the second TPEE film in combination, controlling the melting point of the second TPEE resin to be higher than that of the first TPEE resin, and controlling the absolute difference in enthalpy of fusion between the first and second TPEE films to be 5 J/g to 15 J/g, the polyester composite film of the instant disclosure can be well attached onto the fabric by hot pressing with sufficient peel strength therebetween and thus the attached fabric can possess excellent waterproof performance. Likely, a hot melt adhesive laminate comprising the polyester composite film can also be suitable for the use of fabric lamination, allowing the fabric to possess sufficient peel strength with the hot melt adhesive laminate and providing the fabric with excellent waterproof performance.

Even though numerous characteristics and advantages of the instant disclosure have been set forth in the foregoing description, together with details of the structure and features of the disclosure, the disclosure is illustrative only. Changes may be made in the details, especially in matters of material, shape, size, and arrangement of parts within the principles of the disclosure to the full extent indicated by the broad general meaning of the terms in which the appended claims are expressed.

What is claimed is:

1. A polyester composite film, comprising a first thermoplastic polyether ester elastomer film and a second thermoplastic polyether ester elastomer film, the first thermoplastic polyether ester elastomer film including a first thermoplastic polyether ester elastomer resin, and the second thermoplastic polyether ester elastomer film including a second thermoplastic polyether ester elastomer resin,
   wherein the melting point of the second thermoplastic polyether ester elastomer resin is higher than the melting point of the first thermoplastic polyether ester elastomer resin, and an absolute difference between the enthalpy of fusion of the first thermoplastic polyether ester elastomer film and the enthalpy of fusion of the second thermoplastic polyether ester elastomer film is more than or equal to 5 J/g and less than or equal to 15 J/g.

2. The polyester composite film as claimed in claim 1, wherein the enthalpy of fusion of the first thermoplastic polyether ester elastomer film is more than or equal to 1 J/g and less than or equal to 10 J/g.

3. The polyester composite film as claimed in claim 1, wherein the enthalpy of fusion of the first thermoplastic polyether ester elastomer film is more than or equal to 3 J/g and less than or equal to 10 J/g.

4. The polyester composite film as claimed in claim 1, wherein the enthalpy of fusion of the second thermoplastic polyether ester elastomer film is more than or equal to 5 J/g and less than or equal to 25 J/g.

5. The polyester composite film as claimed in claim 4, wherein the enthalpy of fusion of the second thermoplastic polyether ester elastomer film is more than or equal to 6 J/g and less than or equal to 25 J/g.

6. The polyester composite film as claimed in claim 1, wherein the melting point of the first thermoplastic polyether ester elastomer resin is more than or equal to 90° C. and less than or equal to 164° C.

7. The polyester composite film as claimed in claim 6, wherein the melting point of the first thermoplastic polyether ester elastomer resin is more than or equal to 100° C. and less than or equal to 160° C.

8. The polyester composite film as claimed in claim 1, wherein the melting point of the second thermoplastic polyether ester elastomer resin is more than or equal to 165° C. and less than or equal to 220° C.

9. The polyester composite film as claimed in claim 1, wherein the specific gravity of the first thermoplastic polyether ester elastomer resin or the specific gravity of the second thermoplastic polyether ester elastomer resin is more than or equal to 1.00 and less than or equal to 1.15.

10. The polyester composite film as claimed in claim 1, wherein the Shore hardness of the first thermoplastic polyether ester elastomer resin or the Shore hardness of the second thermoplastic polyether ester elastomer resin is more than or equal to 15 and less than or equal to 45.

11. The polyester composite film as claimed in claim 10, wherein the Shore hardness of the first thermoplastic polyether ester elastomer resin is more than or equal to 15 and less than or equal to 30.

12. The polyester composite film as claimed in claim 10, wherein the Shore hardness of the second thermoplastic polyether ester elastomer resin is more than or equal to 25 and less than or equal to 45.

13. The polyester composite film as claimed in claim 10, wherein the Shore hardness of the second thermoplastic polyether ester elastomer resin is higher than that of the first thermoplastic polyether ester elastomer resin.

14. A hot melt adhesive laminate, comprising the polyester composite film as claimed in claim 1 and a release film, wherein the second thermoplastic polyether ester elastomer film is disposed between the first thermoplastic polyether ester elastomer film and the release film.

* * * * *